(12) United States Patent
Shvedov et al.

(10) Patent No.: US 10,382,506 B2
(45) Date of Patent: Aug. 13, 2019

(54) METHOD OF HOLDING VIRTUAL MEETINGS, SYSTEM FOR HOLDING VIRTUAL MEETINGS, AND VIRTUAL MEETING PARTICIPANT INTERFACE

(71) Applicants: Aleksandr Lvovich Shvedov, Moscow (RU); Viktor Viktorovich Kaplan, g. Zhukovskiy (RU); Boris Aleksandrovich Ponomarev, Moscow (RU)

(72) Inventors: Aleksandr Lvovich Shvedov, Moscow (RU); Viktor Viktorovich Kaplan, g. Zhukovskiy (RU); Boris Aleksandrovich Ponomarev, Moscow (RU)

(*) Notice: Subject to any disclaimer, the term of this patent is extended or adjusted under 35 U.S.C. 154(b) by 178 days.

(21) Appl. No.: 15/128,297

(22) PCT Filed: Jul. 28, 2014

(86) PCT No.: PCT/RU2014/000570
§ 371 (c)(1),
(2) Date: Sep. 22, 2016

(87) PCT Pub. No.: WO2015/152762
PCT Pub. Date: Oct. 8, 2015

(65) Prior Publication Data
US 2017/0142171 A1   May 18, 2017

(30) Foreign Application Priority Data

Apr. 4, 2014   (RU) ................. 2014113041

(51) Int. Cl.
*G06F 15/16* (2006.01)
*H04L 29/06* (2006.01)
(Continued)

(52) U.S. Cl.
CPC ...... *H04L 65/4038* (2013.01); *H04L 65/4015* (2013.01); *H04M 3/56* (2013.01); *H04N 7/157* (2013.01)

(58) Field of Classification Search
USPC ........................................... 709/204
See application file for complete search history.

(56) References Cited

U.S. PATENT DOCUMENTS 5,491,743 A * 2/1996 Shiio .................... H04L 12/1822
348/14.01
5,970,162 A * 10/1999 Kawashima ........... H04N 7/142
348/14.05

(Continued)

*Primary Examiner* — Alicia Baturay
(74) *Attorney, Agent, or Firm* — Nadya Reingand; Yan Hankin

(57) ABSTRACT

Proposed is a method of holding virtual meetings, a system for holing virtual meetings, and a virtual meeting participant interface, which provide for the interaction of a plurality of participant automated workstations, and of at least one automated workstation of an authorized speaker, in which control over the holding of a meeting is carried out from the automated workstation of the authorized speaker by means of striking keys on a keyboard, and wherein each participant is allocated a separate key. The proposed group of inventions provides for the simultaneous control of the transmission of audio content and of video content, and the automated workstation of the authorized speaker is used for controlling when which conference participant is granted the right to speak.

19 Claims, 3 Drawing Sheets

(51) Int. Cl.
*H04M 3/56* (2006.01)
*H04N 7/15* (2006.01)

(56) References Cited

U.S. PATENT DOCUMENTS

| | | | | |
|---|---|---|---|---|
| 6,201,859 | B1* | 3/2001 | Memhard | H04M 3/56 348/E7.083 |
| 7,613,137 | B2* | 11/2009 | Swanson | G06Q 10/10 370/260 |
| 8,095,409 | B2* | 1/2012 | Swanson | G06Q 10/1095 370/260 |
| 8,289,363 | B2* | 10/2012 | Buckler | H04N 7/15 348/14.08 |
| 8,614,735 | B2* | 12/2013 | Buckler | H04N 7/15 348/14.08 |
| 9,026,090 | B2* | 5/2015 | Braudes | H04M 3/42365 455/414.1 |
| 9,088,692 | B2* | 7/2015 | Carter | H04N 7/15 |
| 9,106,652 | B2* | 8/2015 | Albouyeh | H04L 63/08 |
| 9,106,657 | B2* | 8/2015 | Albouyeh | H04L 63/08 |
| 9,369,672 | B2* | 6/2016 | Hiller | H04N 7/152 |
| 2010/0037151 | A1* | 2/2010 | Ackerman | G06Q 10/10 715/753 |
| 2010/0042647 | A1* | 2/2010 | Schultz | H04L 12/1831 379/85 |

* cited by examiner

METHOD OF HOLDING VIRTUAL MEETINGS, SYSTEM FOR HOLDING VIRTUAL MEETINGS, AND VIRTUAL MEETING PARTICIPANT INTERFACE

CROSS-REFERENCE TO RELATED APPLICATION

This patent application is the U.S. National stage application of the PCT application PCT/RU2014/000570 filed Jul. 28, 2014, which claims priority to Russian patent, application RU2014113041 filed Apr. 4, 2014.

FIELD OF INVENTION

The invention proposed belongs to the information technologies area, and namely to the technical appliances ensuring conduct of meetings for participants located far away from each other using the videoconferencing (VCC).

BACKGROUND

The method and apparatus described in U.S. Pat. No. 6,201,859, Intel, Publication as of Mar. 13, 2001, may serve as the nearest analogue of the invention proposed, U.S. Pat. No. 6,201,859 describes virtual meeting conduct means stipulating interaction of a number of automated work stations (AWS) operated by the participants, as well as at least one moderator (chairman/speaker) AWS, where the meeting is managed from the AWS through switching keys of the virtual keyboard, with one separate key being assigned to each participant. The disadvantage of the known technical solution lies in insufficient control capabilities for the virtual meeting due to the absence of the well-established procedure for allocation of floor to the participants with impossibility to take this or that decision. Any participant may request floor simultaneously with the moderator (chairman/speaker) allocating the floor to another participant. In turn, the invention proposed provides further improvement of automated systems ensuring conduct of virtual meetings, which, in turn, allows improving the overall quality of the conducted virtual meetings.

SUMMARY

The procedure for conducting virtual meetings, virtual meeting conduct system, and interface for the participant and competent speaker of a virtual meeting are proposed. This time, the virtual meeting term means a meeting, a videoconference, a web-conference in those case, where the direct audio-visual contact between the participants is impossible or greatly hampered due to the remoteness of the participants, room architecture, etc. In this invention, the competent speaker (with corresponding technical appliances provided to his/her work station) may be understood as a moderator/chairman conducting the virtual meeting, managing the virtual meeting, as well as a full-fledged participant of the virtual meeting competent in the issue under discussion should relevant meeting rules allow this.

DETAILED DESCRIPTION OF THE PREFERRED EMBODIMENT

Figure 1:
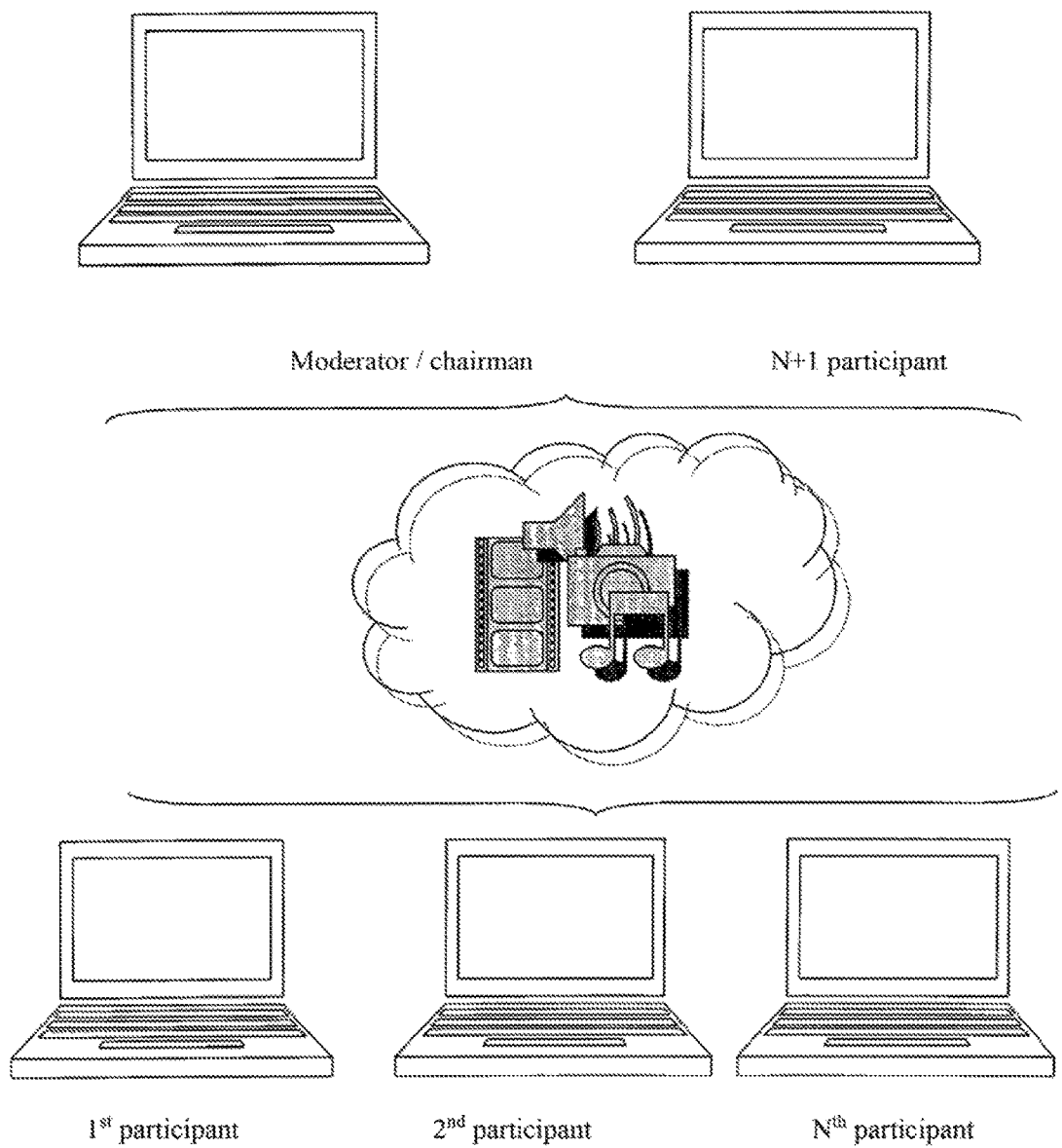
FIG. 1 shows the block diagram of the virtual meeting conduct system off the present invention.
Figure 2:
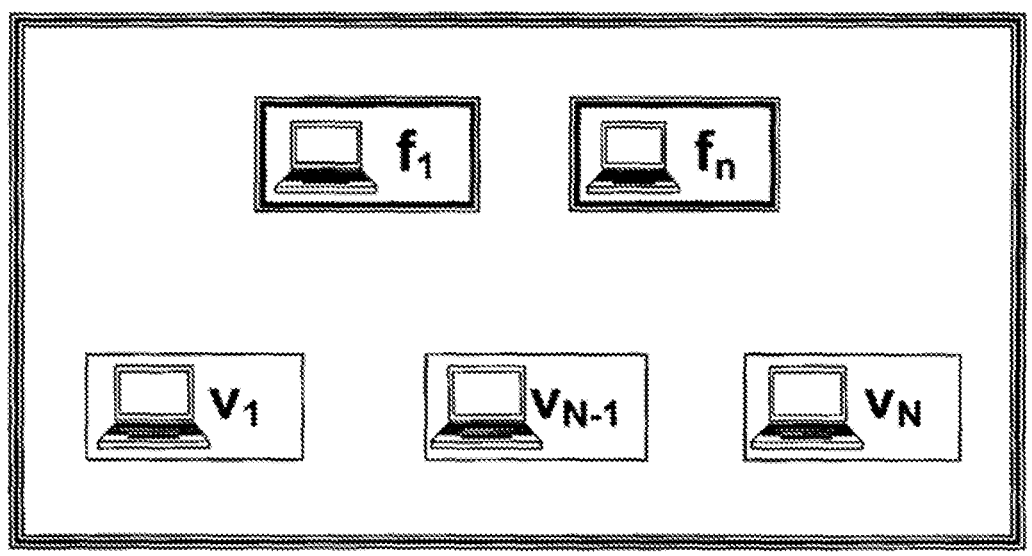
FIG. 2 shows the block diagram of f- and v-meeting participants.

The virtual meeting conduct procedure provides for the interaction of a number of participants' AWSs, and at least one automated work station of a competent speaker, where the meeting is managed from the automated work station by means of switching keys of the keypad, with each participant of the meeting being assigned with a separate key or an element in the list using the state-of-the-art human-machine interface. As opposed to analogue, in the method suggested a screen layout is set up, which represents at least two element subsets of the participant's user interface varying in the level of significance, responsible for the output of the participants' images. Allocation of the floor to any participant of the virtual meeting is managed from the AWS of the competent speaker by means of user interface of this AWS keypad with simultaneous and coordinated management of the audio-content and video-content transmission. Alongside, the element's level of significance is chosen automatically or manually by the competent speaker.

The virtual meeting conduct system includes AWSs of the participants and at least one AWS of the competent speaker interconnected by communication channels or using other known communication services. The system provides management of a floor allocation to any participant of the virtual meeting from the AWS of the competent speaker by means of this automated work station user interface keypad with simultaneous and coordinated management of the audio-content and video-content transmission. Alongside, as, oppose to the analogue, allocation of significant image elements at the user interface display devices (screen layout) of the participant's automated work station includes at least two element subsets varying by the level of significance and providing the output of the participants' images so that the participant's images may change during the meeting. Alongside, the element's level of significance is chosen automatically by the system, or manually by the competent speaker.

The virtual meeting participant's automated work station includes an audio/video processor, which provides communication, receipt of an image of the given participant, graphic interface providing the facilities to display a set of other virtual meeting participants and a competent speaker, as well as advanced functionality such as request for the floor, floor allocation to a participant notification using a known human-machine interface. As oppose to analogue, the automated work station interface includes means providing participation in the virtual meeting by a command passed from the automated work station of the competent speaker managing the virtual meeting conduct from his/her automated work station by switching keypad keys. The layout of the participant's automated work station user interface facilities includes at least two element subsets varying by the level of significance and providing the output of the participants' images so that the participant's images may change during the meeting. Alongside, the element's level of significance is chosen automatically by the system or manually by the competent speaker.

The automated work station of the competent speaker provides functionality of a virtual meeting participant's automated work station and meeting conduct functions in addition. The automated work station of the competent speaker is equipped with an interface including a keypad, where each participant is assigned with a separate key, or a screen form providing the selection of participants from a list, and such meeting function control keys as the selection of the participant's automated work station user interface facilities screen layout, setup and termination of communication with a participant, allocating a floor to participants, temporal audio-channel on/off from the participant, who has already been allocated a floor, floor denial to all participants simultaneously or separately, scheduling of future meetings, including hut not limited to the following: selection of the virtual meeting conduct interval, and preliminary preparation of a speaker's list for each issue in an agenda. The competent speaker's automated work station may represent facilities providing management of a virtual meeting conduct or control of the conduct on the part of a moderator/chairman. Otherwise, it is possible to provide facilities of a competent speaker's automated work station to the automated work station of a meeting participant, who is considering an issue from the meeting agenda, but does not appear to be the meeting moderator/chairman managing the virtual meeting, or controlling its conduct; this means equal rights of the meeting participants. A virtual meeting may represent a set of all participants or a subset of participants of a large, main virtual meeting.

The proposed virtual meeting conduct procedure, virtual meeting conduct system, and virtual meeting participant interface constitute technical solutions reflecting various aspects of the virtual meeting conduct technology mentioned above, which provides the competent speaker (moderator, chairman, reporter, etc.) with such tools for meeting management as a keypad with control keys and a screen layout (FIG. 1,2). A virtual screen-keypad or physical keyboard of any type may be used as a keypad, for example, electromechanical keyboards in the form of a set of normally open keys, keyboards with resistive and capacitive touch panels equipped with optical state indicators. These tools are used by the competent speaker.

Each of the meeting participants is assigned with an individual key or an element of a list at this keypad. Having chosen either key, or a desired participant from the list (having generated and transmitted a communication signal), the competent speaker may allocate the floor to any meeting participant or to any group of participants, for example, when discussing various issued from the agenda. The video image of the given participant emerges on the screen layout along with the speech of this participant, which is heard at all automated work stations of the rest of participants. This is also followed by additional focusing, attention of other virtual meeting participants on this participant (or participants), as well as relevant tuning of the acoustic devices. Similarly, the competent speaker is able to exclude participants from attending the meeting having chosen either key, or the desired participant from the list. In turn, any participant of the meeting may request the floor (via sending a message) to the competent speaker, and the latter allocates the floor in accordance with the above procedure. The floor denial is performed reversely.

An important part of the proposed invention is a use of screen layouts of the meeting participant interface ranked by significance, i.e., the interface layout is formed from a certain number of higher-significance and lower-significance elements. The higher-significance elements may have relative size larger than that of lower-significance elements, and locate closer to that area of graphic interface, where the attention of the participants is focused, for example, to the center of the screen, or, for example, may have a contrasting border. The number of the element's significance levels may be more than two; the relative size is chosen based on peculiarities of the task to solve and a number of significance levels. Further in the description, higher-significance shall be referred as m-elements, and lower-significance elements shall be referred as n-elements. The i-sources shall denote all the sources of video and probably audio signals connected to the virtual meeting and containing images and speech (or other accompanying sound) of the virtual meeting participants, or speech and profile image of the virtual meeting participant, or an image of the electronic document and relevant sound accompaniment.

When the competent speaker allocates the floor to certain meeting participant, the i-source is chosen for output in one of the tai-elements. If there is an element displaying no source among the m-elements (blank element), the chosen i-source shall be displayed in this blank m-element. If there is no blank element among the m-elements, an m-element, which displays a source longer than the other in-elements, shall be search for. In this case, the source corresponding to the found m-element shall be displayed in the blank n-element, or if there is no blank element among the n-elements, in the n-element, which displays a source longer than the other n-elements. Correspondingly, the i-source is displayed in the found m-element. The sources displayed in the m-elements or n-elements of the layout shall be further referred as j-sources. When the participant is denied a floor by the competent speaker, or automatically based on the certain significance criteria, or the source is no longer used, the corresponding j-source ceases to be chosen, and the m-element, which displays it, becomes blank. The number of j-sources displayed in the m-elements and n-elements, or cumulatively for the m-elements and n-elements, may be limited by the maximum value so that no new i-source may be chosen when the specified maximum value has been achieved. Separate elements fix displaying permanent participants, in particular, the competent speaker, may be reserved among the m-elements and n-elements. Alongside, sound content is transmitted only from j-sources or any of the permanent participants, or simultaneously from all the indicated sources as per choice of the competent speaker.

In addition to the above example of the virtual meeting participant image manipulation, other image creation principles may be proposed, i.e., formation of image layouts/meeting layouts, and namely, displaying relevant participants at a certain moment (with corresponding equipment switching [refocusing]); ranking of the meeting participants based on the agenda importance, significance of the participants' opinion, etc., including size variation of fields displaying the participant; graphic distinction of the participant; locking location of the field displaying the participant. This way of forming an image may be performed both in the automated mode by the system in accordance with the above description, and manually from the competent speaker's AWS.

The automated work stations of the competent speaker and participants, described above, include a set of known and widely used equipment, which may be utilized for conducting virtual (remote) meetings and include a videoconference and/or audioconference terminal/terminals, controller-based equipment with peripheral devices, control panels, etc.

One of the proposed centralized virtual meeting technology development trends may be a transition to, a polycentric virtual meeting, i.e., to a such virtual meeting, where virtual submeetings are created inside the set of the meeting participants. These are subsets (clusters) of participants, including a competent speaker for this subset; participants of the meeting in which the competent speaker of the subset is interested; and meeting participants interested in the subset competent speaker. The actions of the subset competent speaker are similar to those described above for the competent speaker. Similarly, it is possible to distinguish subsets of participants with competent speakers of the $3^{rd}$, n-1-th, n-th level, where it is obvious that, inside each subset, a virtual meeting charter stipulating the equality of the participants' rights may be specified.

Figure 3:
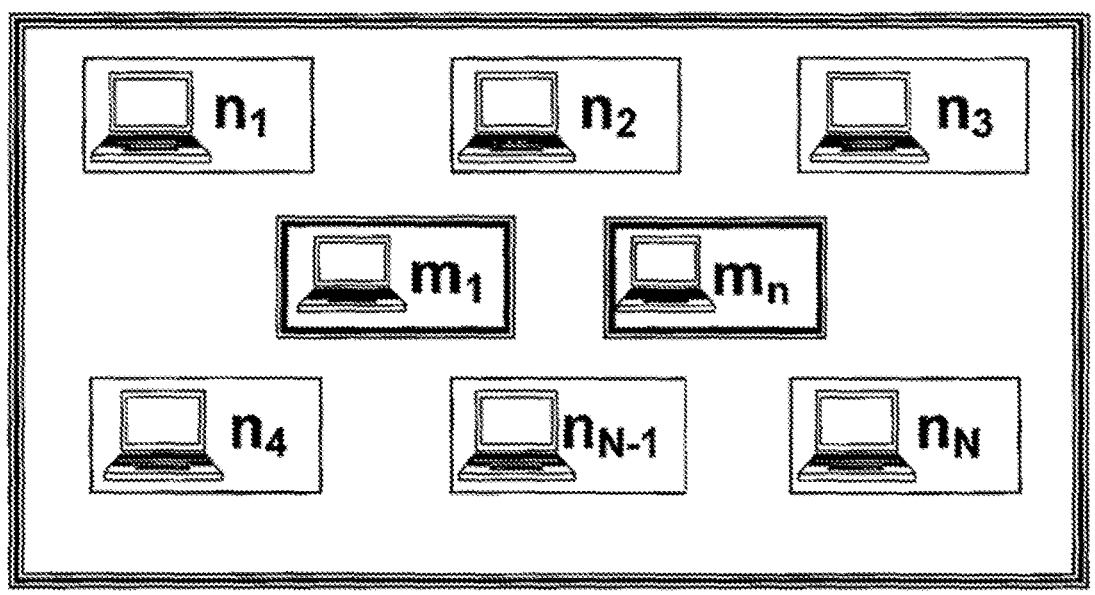
FIG. 3 shows the block diagram of the decentralized meeting of the present invention.

Another proposed centralized virtual meeting technology development trends can be a conduct of a completely decentralized meeting featuring an interaction of a set of competent speakers which can be described as follows (FIG. 3). When conducting a decentralized virtual meeting, certain activities also typical for earlier considered centralized meeting are modelled. These are the focusing of the attention of one participant on the other or others; informing this participant of the fact that his her speech is of interest, and other participants wish to negotiate with him/her; transfer of the focus from the selected participants to the other interested parties. For each virtual meeting participant, a competent speaker, an own layout is created. Participants, for whom the layouts are created, shall be referred to as s-participants s-participants, on whom attention of this s-participant is focused, shall be referred as f-participants, and those, whose attention is focused on this s-participant, shall be referred as v-participants.

F-elements of the layout displaying sources corresponding to the f-participants are created. These f-elements are located in the zone of this participant's displaying device which ensures the highest attention concentration (usually in the central zone), and have a sign of the higher significance, which is commonly either larger relative size or more contrasting element border. V-elements of the layout displaying sources corresponding to the v-participants are created. These v-elements are located in the zone of the display with the least attention concentration (usually in the lower or side peripheral zone), and have a sign of the lower significance, which is commonly either lower relative size or less contrasting element border.

Any certain first s-participant has an option to choose another second s-participant for father imaging on f-elements of his/her screen. The choice can be made both among the participants from the complete participant list, and among v-participants using the state-of-the-art human-machine interface. The interface for choosing the f-participants can be created using the screen of the s-participant by means of a touch-screen technology or a separate input device. The following actions are made in the automated mode: the second s-participant chosen by the first s-participant, who becomes the f-participant for the first s-participant, is displayed on the first participant's screen f-element indicated by the first s-participant or automatically selected by the system. Simultaneously, the first s-participant is displayed on the blank v-element of the second s-participant's screen, and becomes the v-participant for the second s-participant. In case there is no blank v-element on the second s-participant's screen, the first s-participant is displayed on the v-element, which longer displays the certain participant as compared to the other v-elements.

Any s-participant is able to cancel the f-participant choice. The choice is cancelled using the mentioned human-machine interface. The following actions are made in the automated mode: the image of the corresponding f-participant is removed from the f-element of the first s-participant's screen; this f-element becomes blank; the image of the first s-participant is removed from die corresponding v-element of the second s-participant's screen; this v-element becomes blank. Any s-participant is able to change the choice of the f-participants. The choice is changed using the mentioned human-machine interface. The choice may be changed both among the participants from the complete list, and among v-participants. The following actions are made in the automated mode: cancellation of the f-participant selection; choice of a new f-participant. Any s-participant is able to initiate transfer of a group of meeting participants to a new virtual meeting. The transfer is initiated by the automated distribution of notifications reporting the transfer using the mentioned human-machine interface. The notifications are distributed among the f-participants and v-participants, as well as to the s-participants chosen from the complete list. In this case, corresponding f-participants and v-participants shall be transferred to the new virtual meeting together with the s-participant initiated the transfer.

Thus, technical features are proposed to ensure efficient support to the conduct of virtual meetings. The proposed approach to the virtual meeting conduct may provide the basis for the farther development of practical applications in various branches of science and engineering. The above described invention allows experts to create and use the presently best practice. Such experts will be able to understand and appraise availability of variations, combinations, and equivalents of the specific implementation, method and examples of the above. Accordingly, the invention shall not be restricted only by the above variants, methods and examples, but all the variants and methods within the framework and spirit of the invention.

What is claimed is:

1. A virtual meeting conduct procedure, comprising:
providing an interaction of a set of participants' automated work stations (AWSs), including at least one automated work station of a competent speaker, where a meeting conduct management is performed from the competent speaker's automated work station by manipulations of a control keyboard,
creating a screen layout with at least two subsets of user interface elements responsible for an output of participants' images, the images being distinguished by an assignable and adjustable level of significance for each image; and
managing a floor allocation to any participant of the meeting from the competent speaker's automated work station using the control keyboard, while simultaneously and in coordination managing a transfer of audio- and video-content,
wherein an image with a higher significance is displayed in one or more higher-significance user interface elements, the one or more higher-significance user interface elements being located in a high attention portion of a user interface,
wherein an image with a lower significance is displayed in one or more lower-significance user interface elements, the one or more lower significance user interface elements being located in a peripheral portion of a user interface,
wherein another image subsequently submitted by a participant is positioned on a user interface based on a significance level associated with the subsequently submitted image,
wherein the participants are ranked by importance based on a meeting agenda, wherein the one or more higher-significance user interface elements are reserved for images submitted by participants with a highest rank.

2. The procedure of claim 1, wherein the competent speaker's automated work station comprises facilities of a moderator/chairman managing a meeting conduct or monitoring its conduct.

3. The procedure of claim 1, wherein the competent speaker's automated work station comprises facilities of a meeting participant taking the floor in an issue under consideration, wherein the meeting participant taking the floor is not the moderator/chairman.

4. The procedure of claim 3, wherein at least part of the virtual meeting participants' automated work stations comprises automated work stations of competent speakers, wherein the participants have agreed on a mode of a completely decentralized meeting, where for at least part of the participants, a dedicated layout is created displaying and distinguishing participants by significance level, on which an attention of the at least part of the participants is focused, and additional participants, whose attention is focused on the at least part of the participants.

5. The procedure of claim 1, wherein the virtual meeting comprises a subconference among a subset of the participants.

6. The procedure of claim 1, wherein if an image is subsequently presented, the subsequently submitted image replaces a longest displayed image in a higher-significance user interface element, and the longest displayed image in the higher-significance user interface element then replaces an image displayed in a lower-significance user interface element.

7. The procedure of claim 1, wherein a first user interface displays a first set of elements focused on a first participant, and wherein a second user interface displays a second set of elements focused on a second participant, said first and second user interfaces being different from one another, said first and second user interfaces also being different from the moderator's user interface.

8. The procedure of claim 1, wherein a higher ranked participant has an ability to cancel a lower ranked participant's choice.

9. The procedure of claim 1, comprising at least 3 types of participants, said 3 types of participants comprising at least one v-participant, at least one s-participant, and at least one f-participant, wherein all v-participants are focused on at least one s-participant, and wherein all s-participants are focused on at least one f-participant.

10. A virtual meeting conduct system, comprising:
a set of participants' AWSs and at least one competent speaker's automated work station interconnected by communication channels,
wherein an interface of the set of participant's automated work station includes a screen layout displaying at least two subsets of user interface elements responsible for an output of participants' images, the images being distinguished by an assignable and adjustable level of significance; and
wherein the interface of the competent speaker's automated work station includes a keyboard to manage allocating a floor to any one of the set of participants with a simultaneous and coordinated control of an audio- and video-content transfer,
wherein the participants are ranked by importance based on a meeting agenda, wherein one or more higher-significance user interface elements are reserved for images submitted by participants with a highest rank.

11. The system of claim 10, wherein the automated work station of the competent speaker comprises facilities of a moderator/chairman, who manages a meeting conduct or monitors its conduct.

12. The system of claim 10, wherein the automated work station of the competent speaker comprises facilities of a meeting participant taking a floor in an issue under consideration, wherein the participant taking a floor is not the moderator/chairman.

13. The system of claim 12, wherein at least part of the virtual meeting participant's automated work stations comprises competent speakers' automated work stations, and the participants have agreed on a completely decentralized meeting mode, where for at least part of the participants, a dedicated layout is created displaying and distinguishing participants by significance level, on which an attention of the at least part of the participants is focused, and additional participants, whose attention is focused on the at least part of the participants.

14. The system of claim 10, wherein the virtual meeting represents a subconference among a subset of the participants.

15. A virtual meeting participant's interface, comprising:
an automated work station personal computer, comprising a means for displaying a set of virtual meeting participants and a virtual meeting competent speaker, wherein the interface includes a screen layout displaying at least two subsets of user interface elements responsible for an output of the virtual meeting participants' images having an assignable and adjustable level of significance; and
a keyboard to manage a floor allocation to any virtual meeting participant, the keyboard being located at a competent speaker's automated work station, wherein the participants are ranked by importance based on a meeting agenda, wherein the one or more higher-significance user interface elements are reserved for images submitted by participants with a highest rank.

16. The interface of claim 15, wherein the competent speaker's automated work station comprises facilities of a moderator/chairman who manages a meeting conduct or monitors its conduct.

17. The interface of claim 15, wherein the competent speaker's automated work station comprises facilities of a meeting participant taking the floor in an issue under consideration, not being a moderator.

18. The interface of claim 17, wherein at least part of the virtual meeting participant's automated work stations comprise competent speakers' automated work stations, and the participants have agreed on a completely decentralized meeting mode, where for at least part of the participants, a dedicated layout is created displaying and distinguishing participants by significance level of the participants, on which an attention of the at least part of the participants is focused, and additional participants, whose attention is focused on the at least part of the participants.

19. The interface of claim 15, wherein the virtual meeting represents a subconference among a subset of the participants.

* * * * *